United States Patent
Eoh et al.

(10) Patent No.: US 7,522,693 B2
(45) Date of Patent: Apr. 21, 2009

(54) PASSIVE SAFETY-GRADE DECAY-HEAT REMOVAL METHOD AND DECAY-HEAT REMOVAL SYSTEM FOR LMR WITH POOL DIRECT HEAT COOLING PROCESS

(75) Inventors: Jae-Hyuk Eoh, Seoul (KR); Yoon-Sub Sim, Daejeon (KR); Seong-O Kim, Daejeon (KR); Dohee Hahn, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 10/677,941

(22) Filed: Oct. 1, 2003

(65) Prior Publication Data
US 2005/0135544 A1 Jun. 23, 2005

(30) Foreign Application Priority Data
May 21, 2003 (KR) ............... 10-2003-0032389

(51) Int. Cl.
*G21C 9/00* (2006.01)
(52) U.S. Cl. .................. 376/299; 376/298; 376/290
(58) Field of Classification Search ......... 376/299, 376/298, 290
See application file for complete search history.

(56) References Cited
U.S. PATENT DOCUMENTS
4,115,192 A * 9/1978 Jogand ............ 376/298
4,367,194 A * 1/1983 Schenewerk et al. ....... 376/281
4,613,478 A * 9/1986 Sharbaugh ............ 376/290
4,762,667 A * 8/1988 Sharbaugh ............ 376/298
4,780,270 A * 10/1988 Hundal et al. .......... 376/299
5,158,741 A * 10/1992 Boardman et al. ....... 376/299
5,265,136 A * 11/1993 Yamazaki et al. ........ 376/405
5,392,324 A * 2/1995 Mauget et al. .......... 376/299

OTHER PUBLICATIONS

Merriam-Webster's Collegiate Dictionary, 10th Edition, p. 708.*

(Continued)

*Primary Examiner*—Rick Palabrica
(74) *Attorney, Agent, or Firm*—Bachman & LaPointe, P.C.

(57) ABSTRACT

A direct pool cooling type passive safety grade decay heat removal method and system for removing core decay heat in a pool type liquid metal reactor when a normal heat removal system breaks down. In the liquid metal reactor comprising a reactor vessel, the interior of which is partitioned into a hot pool above a core and a cold pool around the core so that liquid level difference between the hot pool and the cold pool is maintained by a primary pumping head under normal steady-state conditions, is disposed at least one circular vertical tube in such a manner that the sodium in the circular vertical tube is maintained with the same liquid level as the liquid level of the sodium in the cold pool. In the circular vertical tube is disposed a sodium-sodium heat exchanger, which is connected to a sodium-air heat exchanger mounted above a reactor building via a heat removing sodium loop, in such a manner that it is placed at the position higher than a liquid level of the sodium in the cold pool under the normal steady-state conditions.

6 Claims, 10 Drawing Sheets

OTHER PUBLICATIONS

Dohee Hahn, "Status of National Programmas on Fast Reactors in Korea", IAEA Technical Working Group on Fast Reactors, Daejeon Korea, May 12-14, 2003.

Yoon Sub Sim et al., "Analysis of the Relations Between Design Parameters and Performance in the Passive Safety Decay Heat Removal System", Journal of the Korean Nuclear Society vol. 31, No. 3, pp. 276-288, Jun. 1999.

Yoon Sub Sim, et al., "Heat transfer enhancement by radiation structures for an air channel of LMR decay heat removal", Nuclear Engineering and Design 199 (2000) pp. 167-186.

JaeHyuk Eoh, et al. "Feasibility Study on Enhancement of Decay Heat Removal Capacity in LMR using Radiation Structures", the 2002's academic conference of the Korean Nuclear Society, Fall 2002.

B. Farrar, et al., "Fast reactor decay heat removal; approach to the safety system design in Japan and Europe", Nuclear Engineering and Design 193 (1999) pp. 45-54.

* cited by examiner

PRIOR ART FIG. 9

PASSIVE SAFETY-GRADE DECAY-HEAT REMOVAL METHOD AND DECAY-HEAT REMOVAL SYSTEM FOR LMR WITH POOL DIRECT HEAT COOLING PROCESS

BACKGROUND OF THE INVENTION

1. Field of the Invention

The present invention relates, in general, to removal of core decay heat in a pool type liquid metal reactor which uses liquid sodium as a coolant when a normal heat removal system breaks down and, more particularly, to a direct pool cooling type passive safety grade decay heat removal method and system for a liquid metal reactor, which is capable of providing a large heat removal capacity suitable in design of a large thermal rated liquid metal reactor, and for minimizing heat loss during the normal plant operation while improving operational reliability.

2. Description of the Related Art

A general liquid metal reactor (LMR) is provided with a residual heat removal system (RHRS) for removing core decay heat arising due to urgent shutdown of the reactor when a normal heat removal system, which is formed through a reactor core, primary heat transport system (PHTS), an intermediate heat exchanger (IHX), intermediate heat transport system (IHTS) and a steam generator system (SGS), breaks down.

A conventional residual heat removal system for a pool type liquid metal reactor is designed to effectively remove core decay heat using thermal inertia of a hot pool disposed above a core outlet. The conventional residual heat removal systems are generally classified into the passive vessel cooling system (PVCS) and the direct reactor cooling system (DRCS) according to a residual heat removal capacity on the basis of thermal output of the core of a liquid metal reactor.

FIG. 9 shows the passive vessel cooling system (PVCS). When a normal heat removal system breaks down, sodium in a hot pool 150 is heated, and accordingly expanded. The expansion of the sodium raises its liquid level X1 above an overflow slot on a reactor baffle 130. As hot sodium heated in a core 110 flows over the overflow slot, it makes direct contact with a reactor vessel 100 so that convection and conduction heat transfer is performed between the hot sodium and the reactor vessel 100. In this way, core decay heat is removed. The passive vessel cooling system is a system applicable to small and medium thermal rated pool type liquid metal reactors with relatively low core heat output of 1,000 MWth or less.

Specifically, the heat absorbed into the reactor vessel 100 by means of the convection and the conduction is transmitted to a containment vessel 230 disposed outside the reactor vessel 100 by means of thermal radiation. The heat of the containment vessel 230 is absorbed by air flowing through an air channel radially divided by an air separator 220 disposed between the containment vessel 230 and a reactor support wall made of concrete and surrounding the containment vessel 230. Finally, the air heated in the air channel inside the air separator 220 is continuously discharged into the atmosphere, and external cold air is continuously introduced along the air channel outside the air separator. Through natural circulation of air as described above, the core decay heat is passively and continuously removed.

The passive vessel cooling system requires neither operator action nor any active component actuation when the normal heat removal system breaks down. Consequently, this system has an advantage in that it adopts a completely passive concept, by which operational reliability is guaranteed. However, the passive vessel cooling system is not applicable to a large thermal rated reactor since it can only be suitably used in a liquid metal reactor with relatively low core heat output of 1,000 MWth or less, as mentioned above, considering economical efficiency based on heat transfer surface area determined by the diameter of the reactor vessel and the related requirement for accommodating components in the pool.

FIG. 10 shows the direct reactor cooling system (DRCS). As shown in FIG. 10, the direct reactor cooling system comprises a sodium-sodium heat exchanger 20' disposed in a hot pool 150 in such a manner that it is below the liquid level X2 of hot sodium in the hot pool 150, a sodium-air heat exchanger 40' disposed on a reactor building, and a heat removing sodium loop 30' connected between the sodium-sodium heat exchanger 20' and the sodium-air heat exchanger 40'. The direct reactor cooling system is a system for discharging heat into a final heat sink, i.e., the atmosphere through natural circulation of sodium using density difference in the heat removing sodium loop 30' formed by elevation difference between a heat inflow part and a heat sink part. The direct reactor cooling system has advantages in that it is not restricted by heat output of the core unlike the aforesaid passive vessel cooling system, and in that it provides a sufficient decay heat removal capacity required according to the goal of design.

In the direct reactor cooling system (DRCS), however, heat must be continuously supplied even in the normal plant operation in order to prevent solidification of liquid sodium in the heat removing sodium loop 30' when the heat is transmitted from the hot pool 150 to the sodium-air heat exchanger 40' via the heat removing sodium loop 30'. Such heat supplied during the normal plant operation is considered as a heat loss of a pool type liquid metal reactor system. Consequently, the direct reactor cooling system is designed to have the following components to minimize the heat loss during the normal steady-state conditions. In an air flow inlet 43', through which air is introduced into the sodium-air heat exchanger 40', and an air flow outlet 47', through which air is discharged from the sodium-air heat exchanger 40', are disposed dampers 170, respectively. In addition, isolation valves 180 are mounted in the heat removing sodium loop 30'. The flow rate of sodium and air is controlled by proper manipulations for the opening fraction of the dampers 170 and the isolation valves 180 so that the minimum amount of heat necessary to prevent solidification of the liquid sodium is supplied to the heat removing sodium loop 30' during the normal plant operation. Consequently, the heat loss is minimized during the normal plant operation of the hot pool. When the normal heat removal system breaks down, the dampers 170 and the isolation valves 180 are opened to the maximum extent so that the core decay heat is effectively removed.

As described above, the isolation valves 180 are disposed in the heat removing sodium loop 30', and the dampers 170 are disposed in the air flow inlet 43' and the air flow outlet 47', so that the opening fraction of the isolation valves 180 and the dampers is controlled to supply proper amount of heat necessary both for minimizing a heat loss in the normal plant operation and for preventing solidification of sodium in the heat removing sodium loop 30'. To increase operational reliability of the decay heat removal system during system transient conditions, the isolation valves 180 and the dampers 170 are designed with a specific safety grade so that the direct reactor cooling system has a passive concept. In the direct reactor cooling system, however, mechanical driving requirements of the isolation valves 180 and the dampers 170 must be satisfied, which means that decay heat removal function on the basis of the completely passive concept is impossible.

Furthermore, the direct reactor cooling system (DRCS) is inferior to the passive vessel cooling system (PVCS) in terms of operational safety related to operational reliability of the decay heat removal system.

SUMMARY OF THE INVENTION

Therefore, the present invention has been made in view of the above problems, and it is an object of the present invention to provide a direct pool cooling type passive safety grade decay heat removal method and system for a liquid metal reactor, which are capable of providing a large heat removal capacity required by a large thermal rated pool type liquid metal reactor, having a completely passive concept so that core decay heat is always effectively removed without operator action or any active component actuation, and minimizing heat loss during the normal plant operation while improving operational reliability.

In accordance with one aspect of the present invention, the above and other objects can be accomplished by the provision of a direct pool cooling type passive safety grade decay heat removal method for a liquid metal reactor, wherein liquid level difference between a hot pool defined above the reactor core and inside a reactor baffle and a cold pool defined between the reactor baffle and the inner wall of a reactor vessel is maintained by a primary pumping head under normal steady-state conditions, the interior of the reactor vessel being partitioned into the hot pool and the cold pool by the reactor baffle, wherein a sodium-sodium heat exchanger connected to a sodium-air heat exchanger mounted above a reactor building via a heat removing sodium loop is disposed at the position higher than a liquid level of the sodium in the cold pool under the normal steady-state conditions, and wherein the liquid level of the sodium in the cold pool rises so that the liquid level difference between the hot pool and the cold pool is eliminated when the primary pump trip occurs due to a breakdown of a normal heat removal system, and the sodium in the hot pool is expanded due to a continuously generated core decay heat so that the sodium in the hot pool overflows into the cold pool to form natural circulation between the hot pool and the cold pool, whereby the sodium-sodium heat exchanger makes direct contact with the hot sodium so that the core decay heat is discharged into a final heat sink, the atmosphere.

Preferably, the outer circumference of the reactor vessel is also cooled with external air by using a passive vessel cooling system.

Preferably, at least one circular vertical tube is disposed in the hot pool inside the reactor baffle, the circular vertical tube has the lower end communicating with the cold pool so that the sodium in the circular vertical tube has the same liquid level as the liquid level of the sodium in the cold pool, and the upper end extended upward to the extent that it is placed at the position higher than a liquid level of the sodium in the hot pool under the normal steady-state conditions, the sodium-sodium heat exchanger is disposed in the circular vertical tube while it is placed at the position higher than the liquid level of the sodium in the cold pool under the normal steady-state conditions, and heat transfer by thermal radiation is performed between the inner circumference of the circular vertical tube and the sodium-sodium heat exchanger under the normal steady-state conditions so that solidification of the sodium in the heat removing sodium loop is prevented.

Preferably, the core decay heat is removed by the combination of the heat removing sodium loop and the sodium-air heat exchanger on the basis of a completely passive concept without the provision of dampers disposed in an air inlet and an air outlet of the sodium-air heat exchanger and isolation valves mounted in the heat removing sodium loop.

Preferably, the heat transfer by thermal radiation is quantitatively controlled by manipulating surface emissivity of the sodium-sodium heat exchanger and the circular vertical tube to minimize heat loss under the normal steady-state conditions so that the minimum amount of heat necessary to prevent solidification of the sodium is supplied to the heat removing sodium loop.

In accordance with another aspect of the present invention, there is provided a direct pool cooling type passive safety grade decay heat removal system for a liquid metal reactor comprising a reactor vessel having the interior partitioned into a hot pool and a cold pool by a cylindrical reactor baffle, the hot pool being defined above a core and inside the reactor baffle, the cold pool being defined between the reactor baffle and the inner wall of the reactor vessel, liquid level difference between the hot pool and the cold pool being maintained by a primary pumping head under normal steady-state conditions, wherein the decay heat removal system for removing core decay heat when a normal heat removal system breaks down comprises, at least one sodium-sodium heat exchanger disposed in the cold pool while being placed at the position higher than a liquid level of the sodium in the cold pool under the normal steady-state conditions so that only heat transfer by thermal radiation is performed under the normal steady-state conditions, at least one sodium-air heat exchanger mounted above a reactor building, and a heat removing sodium loop connected between the sodium-sodium heat exchanger and the sodium-air heat exchanger.

Preferably, the direct pool cooling type passive safety grade decay heat removal system of the present invention further comprises at least one circular vertical tube disposed at the edge of the hot pool inside the reactor baffle, the circular vertical tube having the lower end communicating with the cold pool so that the sodium in the circular vertical tube is maintained with the same liquid level as the liquid level of the sodium in the cold pool, and the upper end disposed at the position higher than a liquid level of the sodium in the hot pool, wherein the sodium-sodium heat exchanger is disposed in the circular vertical tube while it is placed at the position higher than the liquid level of the sodium in the cold pool under the normal steady-state conditions.

Preferably, the sodium-air heat exchanger is not provided at an air inlet and an air outlet thereof with dampers, and the heat removing sodium loop is not provided with isolation valves.

Preferably, the sodium-sodium heat exchanger comprises, a U-shaped heat transmitting unit consisting of a cold sodium downcomer vertically arranged in the sodium-sodium heat exchanger while being disposed along the center of the sodium-sodium heat exchanger, the upper end of which is connected to a cold leg of the heat removing sodium loop, and a plurality of heat transmitting tubes surrounding the outer circumference of the cold sodium downcomer, the heat transmitting tubes being concentrically arranged while they are uniformly spaced apart from each other in the radial direction, and a heated sodium collector provided at the upper part of the U-shaped heat transmitting unit, the heated sodium collector communicating with the heat transmitting tubes and connected to a hot leg of the heat removing sodium loop.

Preferably, the sodium-sodium heat exchanger is disposed in such a manner that the lower end of the heated sodium collector is placed at the position higher than a liquid level of the sodium rising by pool sodium expansion under transient conditions.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, a preferred embodiment of the present invention will be described in detail with reference to the accompanying drawings. In the following, the decay heat removal method and system of the present invention will be specifically described on the basis of a liquid metal reactor to which the decay heat removal system of the present invention is applied.

Figure 1:
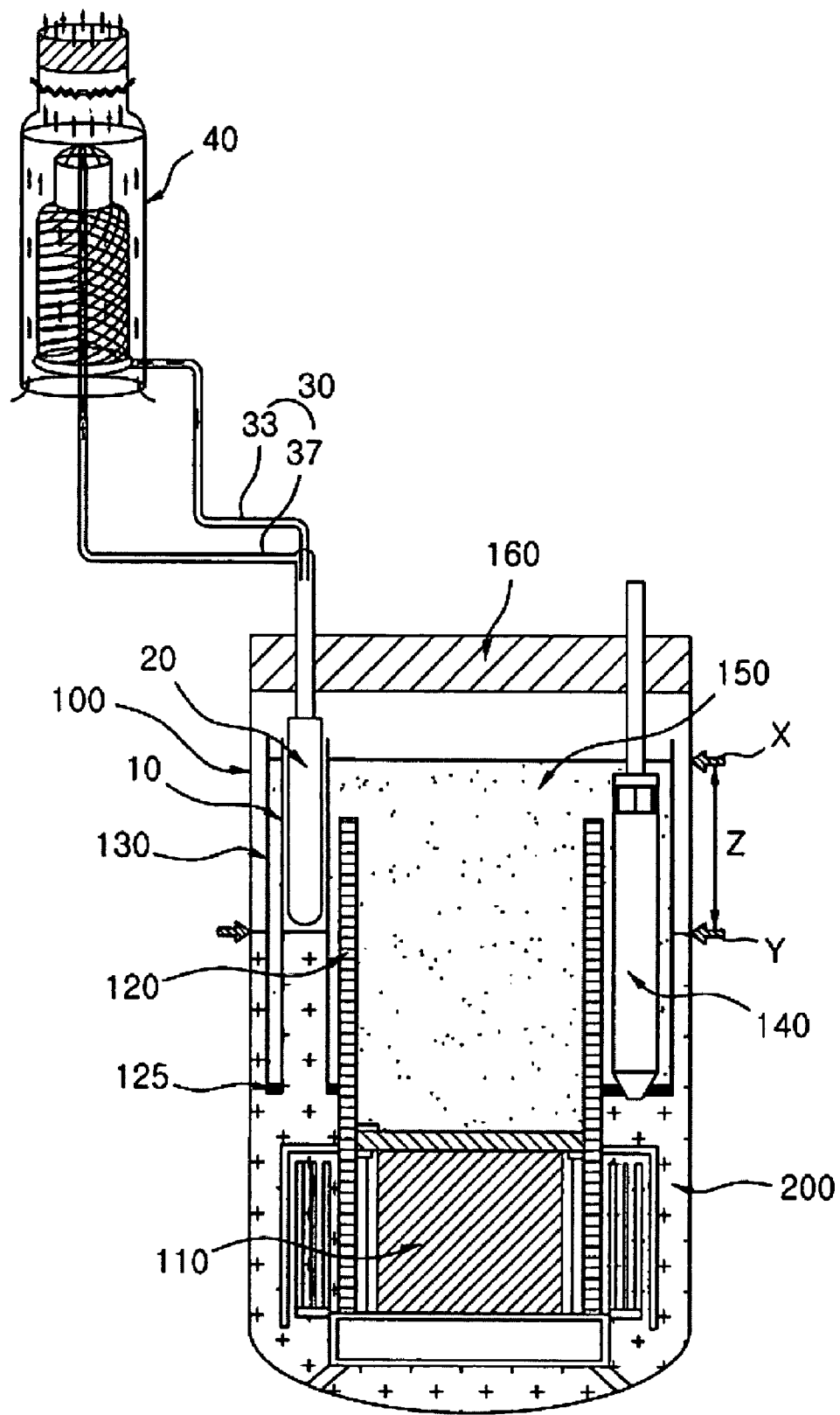
FIG. 1 is a longitudinal sectional conceptual view of a liquid metal reactor, to which a decay heat removal system according to a preferred embodiment of the present invention is applied.
Figure 2:
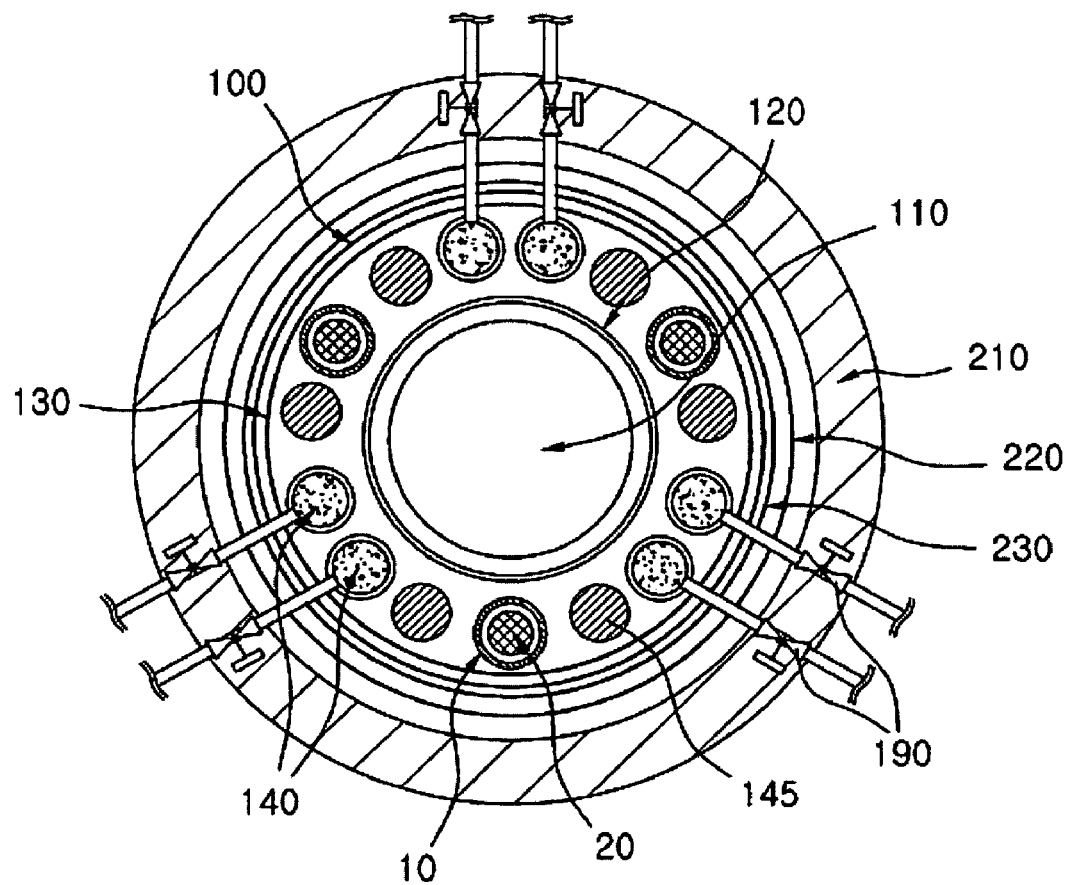
FIG. 2 is a cross sectional conceptual view of a liquid metal reactor, to which a decay heat removal system according to a preferred embodiment of the present invention is applied.

As shown in FIGS. 1 and 2, a liquid metal reactor, to which the decay heat removal system according to the preferred embodiment of the present invention is applied, comprises a reactor vessel 100, a reactor core 110 concentrically disposed in the lower part of the reactor vessel 100, and a cylindrical core support barrel 120 surrounding the reactor core 110 and extended upward to a predetermined height above the reactor core 110. To the cylindrical core support barrel 120 is attached a ring-shaped separating plate 125, which is vertically extended from the outer circumference of the core support barrel 120 and horizontally disposed. To the edge of the separating plate 125 is attached a cylindrical reactor baffle 130, which is vertically upwardly extended from the edge of the separating plate 125 and disposed between the inner wall of the reactor vessel 100 and the outer circumference of the core support barrel 120. The interior of the reactor vessel 100 is partitioned into a hot pool 150 and a cold pool 200. The hot pool 150 is defined above the reactor core 110 and the separating plate 125 and inside the reactor baffle 130, and the cold pool 200 is defined below the separating plate 125 and between the outer circumference of the reactor baffle 130 and the inner wall of the reactor vessel 100. The height of the reactor baffle 130 is higher than the liquid level X of sodium in the hot pool 150 during the normal plant operation so that overflow of hot sodium into the cold pool 200 is prevented. The height of the core support barrel 120 is lower than the liquid level X of sodium in the hot pool 150 so that the hot sodium is always filled in the space outside the core support barrel 120 in the hot pool 150.

Between the outer circumference of the core support barrel 120 and the inner circumference of the reactor baffle 130 are disposed a plurality of intermediate heat exchangers (IHX) 140, which are components constituting a normal heat removal system. The intermediate heat exchangers 140 are preferably arranged in a predetermined array pattern. Between the outer circumference of the core support barrel 120 and the inner circumference of the reactor baffle 130 are also disposed a plurality of primary pumps 145 for pumping liquid sodium in the cold pool 200 into the hot pool 150 via the reactor core 110 so that a predetermined liquid level difference Z is maintained between the hot pool 150 and the cold pool 200 during the normal plant operation. The primary pumps 145 are also preferably arranged in a predetermined array pattern. The intermediate heat exchangers 140 are disposed in pairs, and each pair of intermediate heat exchangers 140 are connected to steam generators (not shown) disposed outside the reactor boundary so that heat generated from the reactor core 110 is removed during the normal plant operation. In piping connected between the intermediate heat exchangers 140 and the steam generators are mounted intermediate isolation valves 190 for stopping flow of internal sodium under transient conditions, i.e., when a severe accident including radioactive sodium leak from the intermediate heat exchanger 140 to the secondary system occurs.

At the edge of the hot pool 150, which is close to the inside of the reactor baffle 130, are disposed three circular vertical tubes 10. Each circular vertical tube 10 has the lower end communicating with the cold pool 200 so that the sodium in each circular vertical tube 10 is maintained with the same liquid level as the liquid level Y of the sodium in the cold pool 200 by pumping head of the primary pumps 145. The upper end of each circular vertical tube 10 is disposed in such a manner that it is higher than the liquid level X of the sodium in the hot pool 150 during the normal plant operation like the reactor baffle 130.

More specifically, the circular vertical tubes 10 are disposed between the inner wall of the reactor baffle 130 and the outer wall of the core support barrel 120 in such a manner that they are spaced uniformly apart from each other while they do not overlap with the intermediate heat exchangers 140 and the primary pumps 145, as shown in FIG. 2. The lower end of each circular vertical tube 10 penetrates through the separating plate 125 to communicate with the cold pool 200. The upper end of each circular vertical tube 10 is vertically extended in such a manner that the height of the upper end is identical to that of the reactor baffle 130. Consequently, the circular vertical tubes 10 do not communicate with the hot pool 150 but with the cold pool 200 so that the sodium in each circular vertical tube 10 has the same liquid level as the liquid level Y of the sodium in the cold pool 200 by pumping of the primary pumps 145. The outer circumference of each circular vertical tube 10 is in contact with the sodium in the hot pool 150. In the empty space above the hot pool 150 and the cold pool 200 including inside the circular vertical tubes 10 is filled an inert gas, such as helium, nitrogen, argon, etc. The filled inert gas absorbs small pressure fluctuation arising when the pressure is excessive in the hot and cold pools 150 and 200 so that relatively rapid over-pressurization of the entire system is prevented. In addition, the filled inert gas serves as a thermal insulation for decreasing the amount of heat transmitted from the hot pool 150 to the reactor head 160.

Figure 3:
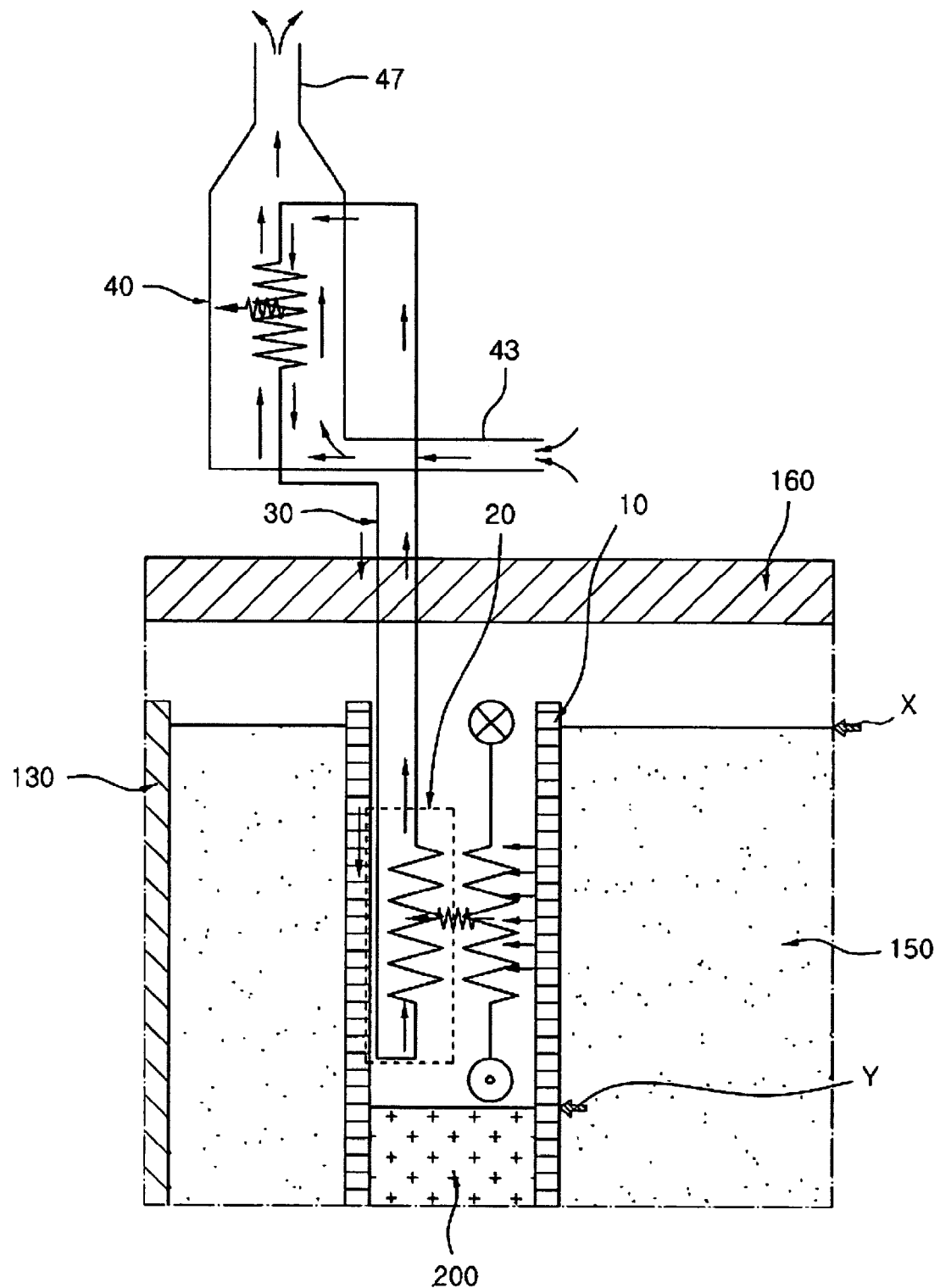
FIG. 3 is a functional view showing the operation of a decay heat removal system according to a preferred embodiment of the present invention under normal steady-state conditions.

As shown in FIG. 3, a sodium-sodium heat exchanger 20 is disposed in the circular vertical tube 10 in such a manner that the sodium-sodium heat exchanger 20 is placed at the position higher than the liquid level Y of the sodium in the cold pool 200 during the normal plant operation. Consequently, the sodium-sodium heat exchanger 20 is not in direct contact with the sodium in the cold pool 200, and thus only heat transfer by thermal radiation is performed between the sodium-sodium heat exchanger 20 and the inner circumference of the circular vertical tube 10.

To the sodium-sodium heat exchanger 20 is connected a sodium-air heat exchanger 40, which is mounted above the reactor building, via a heat removing sodium loop 30 penetrating through the reactor head 160, so that the heat absorbed from the reactor pool is discharged from the sodium-air heat exchanger 40 to the atmosphere.

In the sodium-air heat exchanger 40, direct heat exchange is performed between the heat transmitted from the hot pool 150 via the heat removing sodium loop 30 and an air introduced into the sodium-air heat exchanger 40 through an air inlet 43 formed at the lower part of the sodium-air heat exchanger 40 and discharged from the sodium-air heat exchanger 40 through an air outlet 47 formed at the upper part of the sodium-air heat exchanger 40 after the heat exchange between the heat transfer tube surface of the sodium-air heat exchanger and an air.

Figure 10:
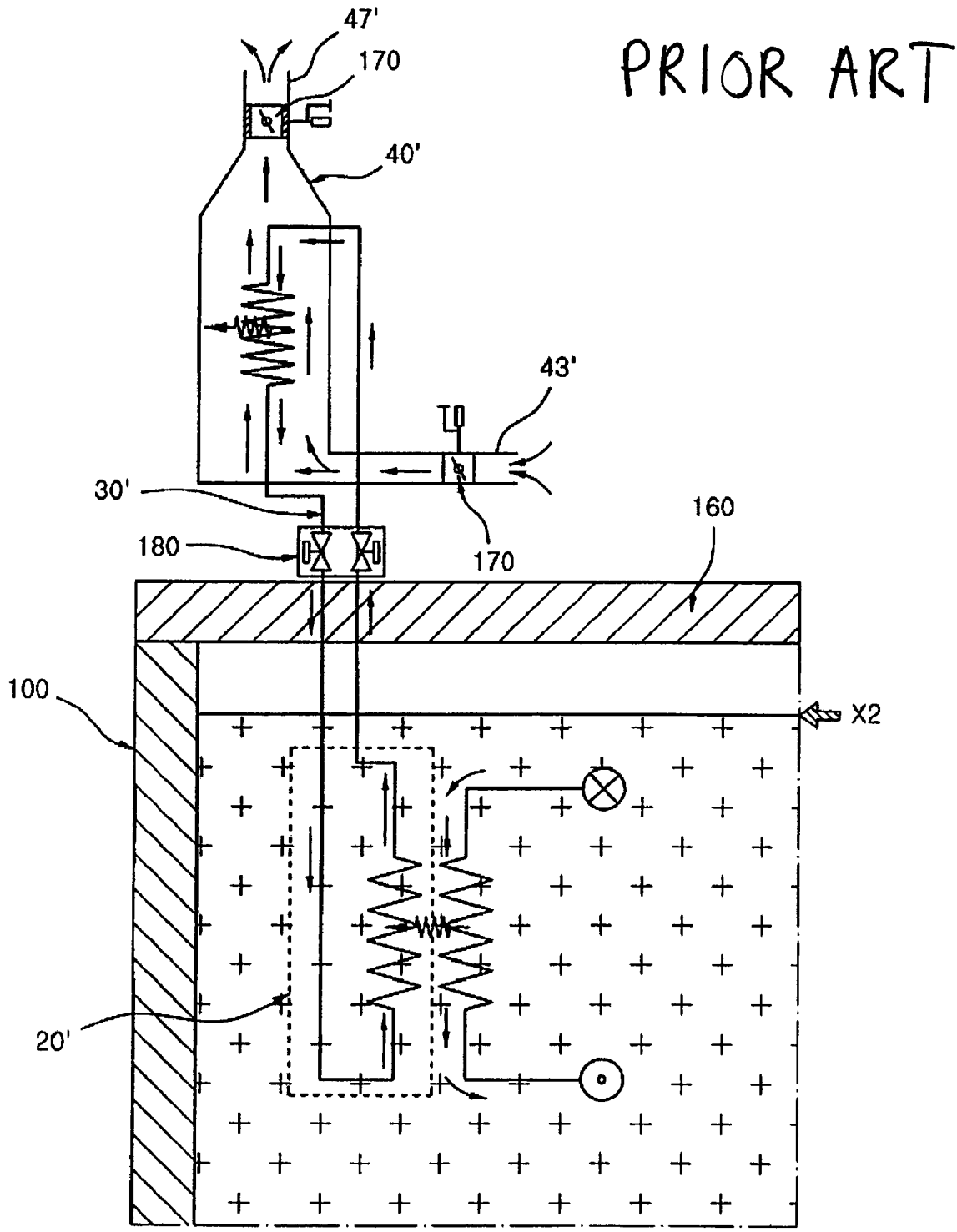
FIG. 10 is a partial conceptual view showing the heat transfer mechanism of a liquid metal reactor equipped with a conventional direct reactor cooling type decay heat removal system.

The decay heat removal system for a liquid metal reactor of the present invention with the above-stated construction can minimize heat loss during the normal plant operation and supply the minimum amount of heat necessary to prevent solidification of the sodium in the heat removing sodium loop 30 during the normal plant operation without the provision of the dampers 170 disposed in the air flow inlet 43' and the air flow outlet 47' of the sodium-air heat exchanger 40' and the isolation valves 180 mounted in the heat removing sodium loop 30' as in the conventional direct reactor cooling system of FIG. 10. Consequently, the decay heat removal system for a liquid metal reactor of the present invention is operated on the basis of a completely passive concept.

More specifically, the decay heat removal system of the present invention does not control the amount of heat removed from the decay heat removal system by controlling flow rate of the air through the dampers 170 during the normal plant operation and by controlling flow rate of the sodium through the isolation valves 180 during the normal plant operation, which is realized by complicated components including a mechanical driving unit. The decay heat removal system of the present invention quantitatively controls heat transfer rate by thermal radiation between the circular vertical tubes 10 and the sodium-sodium heat exchanger 20 through determination of the optimum surface emissivity of a heat transmitting surface so that the minimum amount of heat necessary to prevent solidification of the sodium is supplied to the heat removing sodium loop 30 during the normal plant operation.

Figure 5:
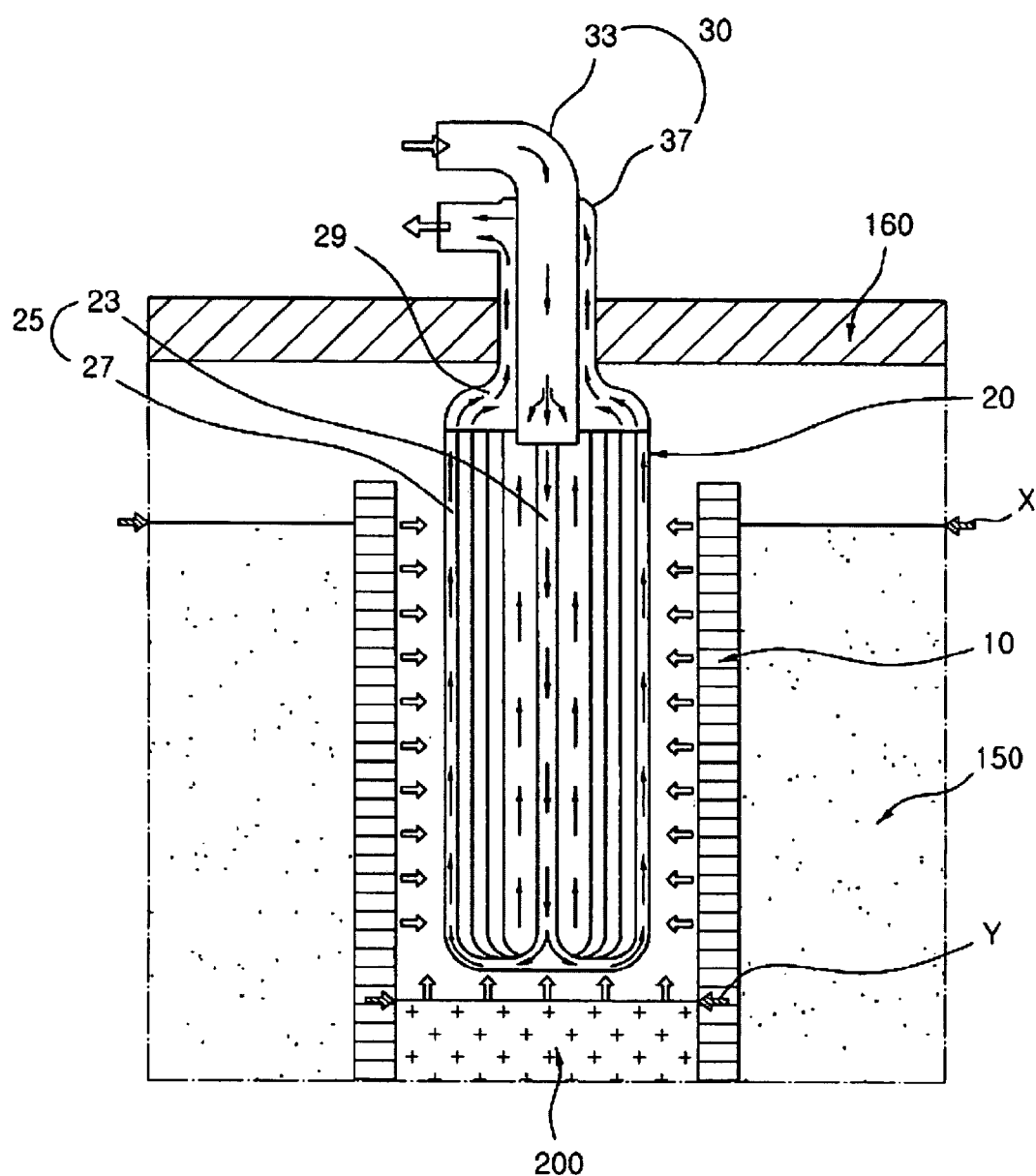
FIG. 5 is a detailed conceptual view showing the flow and heat exchange mechanism arising between a sodium-sodium heat exchanger according to a preferred embodiment of the present invention and components of a liquid metal reactor around the sodium-sodium heat exchanger under normal steady-state conditions.
Figure 6:
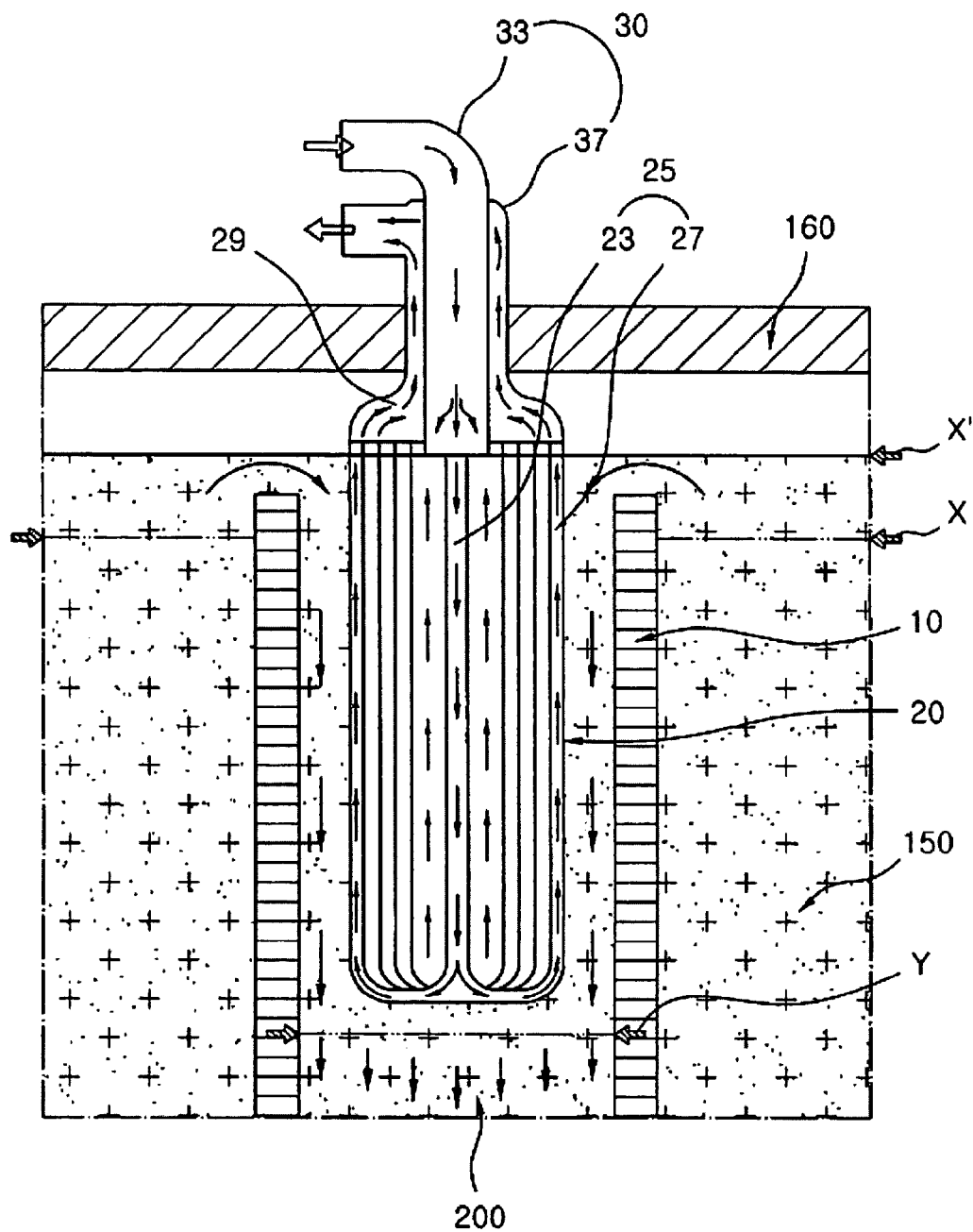
FIG. 6 is a detailed conceptual view showing the flow and heat exchange mechanism arising between a sodium-sodium heat exchanger according to a preferred embodiment of the present invention and components of a liquid metal reactor around the sodium-sodium heat exchanger under transient conditions.

To efficiently remove decay heat and supply the minimum amount of heat necessary to prevent solidification of sodium, the sodium-sodium heat exchanger 20 includes a U-shaped heat transmitting unit 25, which is suitable to perform heat exchange between sodium and sodium by natural circulation, as shown in FIGS. 5 and 6, so that the decay heat removal system of the present invention provides more efficient heat removal performance under transient conditions as well as under normal steady-state conditions.

The U-shaped heat transmitting unit 25 comprises a cold sodium downcomer 23 vertically arranged in the sodium-sodium heat exchanger 20 while being disposed along the center of the sodium-sodium heat exchanger 20, the upper end of which is connected to a cold leg 33 of the heat removing sodium loop 30, and a plurality of heat transmitting tubes 27 surrounding the outer circumference of the cold sodium downcomer 23. The heat transmitting tubes 27 are concentrically arranged while they are uniformly spaced apart from each other in the radial direction. Consequently, cold sodium moving downward through the cold sodium downcomer 23 efficiently absorbs the external heat as it moves upward through the heat transmitting tubes 27.

Also, the sodium-sodium heat exchanger 20 is provided at the upper part thereof with a heated sodium collector 29 for collecting the sodium in the sodium-sodium heat exchanger 20 absorbing the heat from the hot sodium as it moves upward through the heat transmitting tubes 27. The heated sodium collected by the heated sodium collector 29 is supplied into the sodium-air heat exchanger 40 mounted above the reactor building via a hot leg 37 of the heat removing sodium loop 30 by natural circulation in the heat removing sodium loop 30 arising from density difference.

The heat transmitting tubes 27 of the sodium-sodium heat exchanger 20 are uniformly arranged in the radial direction so that heat is properly transmitted into the heat removing sodium loop 30 through heat transfer by thermal radiation during the normal plant operation. Furthermore, the lower end of the heated sodium collector 29, which is disposed in the upper part of the sodium-sodium heat exchanger 20, is placed at the position higher than the liquid level X' of the sodium rising by expansion of the sodium under transient conditions so that problems caused by direct contact of the heated sodium collector 29 and the hot sodium are eliminated and flow interference is minimized even when the hot sodium overflows into the circular vertical tube 10.

The surface emissivity of the heat transmitting tubes 27 of the sodium-sodium heat exchanger 20 and the circular vertical tubes 10 may be controlled by various kinds of surface treatment, which changes surface roughness or degree of oxidization, so that the minimum amount of heat necessary to prevent solidification of the sodium is supplied to the heat removing sodium loop 30. Consequently, heat loss is minimized during the normal plant operation.

The operation of the decay heat removal system of the present invention with the above-stated construction will now be described.

Under normal steady-state conditions, the sodium is not filled in the upper part of the circular vertical tube 10 by liquid level difference Z generated from pumping head of the primary pump 145, as shown in FIG. 3. Consequently, heat transfer only by thermal radiation is performed between the inner circumference of the circular vertical tube 10 and the surfaces of the heat transmitting tubes 27 of the sodium-sodium heat exchanger 20 so that the heat from the hot pool 150 is absorbed by the sodium-sodium heat exchanger 20, and then the absorbed heat is supplied into the heat removing sodium loop 30. The heat supplied into the heat removing sodium loop 30 is used to prevent solidification of sodium in the heat removing sodium loop 30. Since such supply of the heat into the heat removing sodium loop 30 is heat loss from the point of view of efficiency of the entire liquid metal reactor system during the normal steady-state conditions, surface emissivity of the heat transmitting tubes 27 of the sodium-sodium heat exchanger 20 and the circular vertical tube 10 is properly controlled so that the minimum amount of heat transfer rate is permitted.

Figure 4:
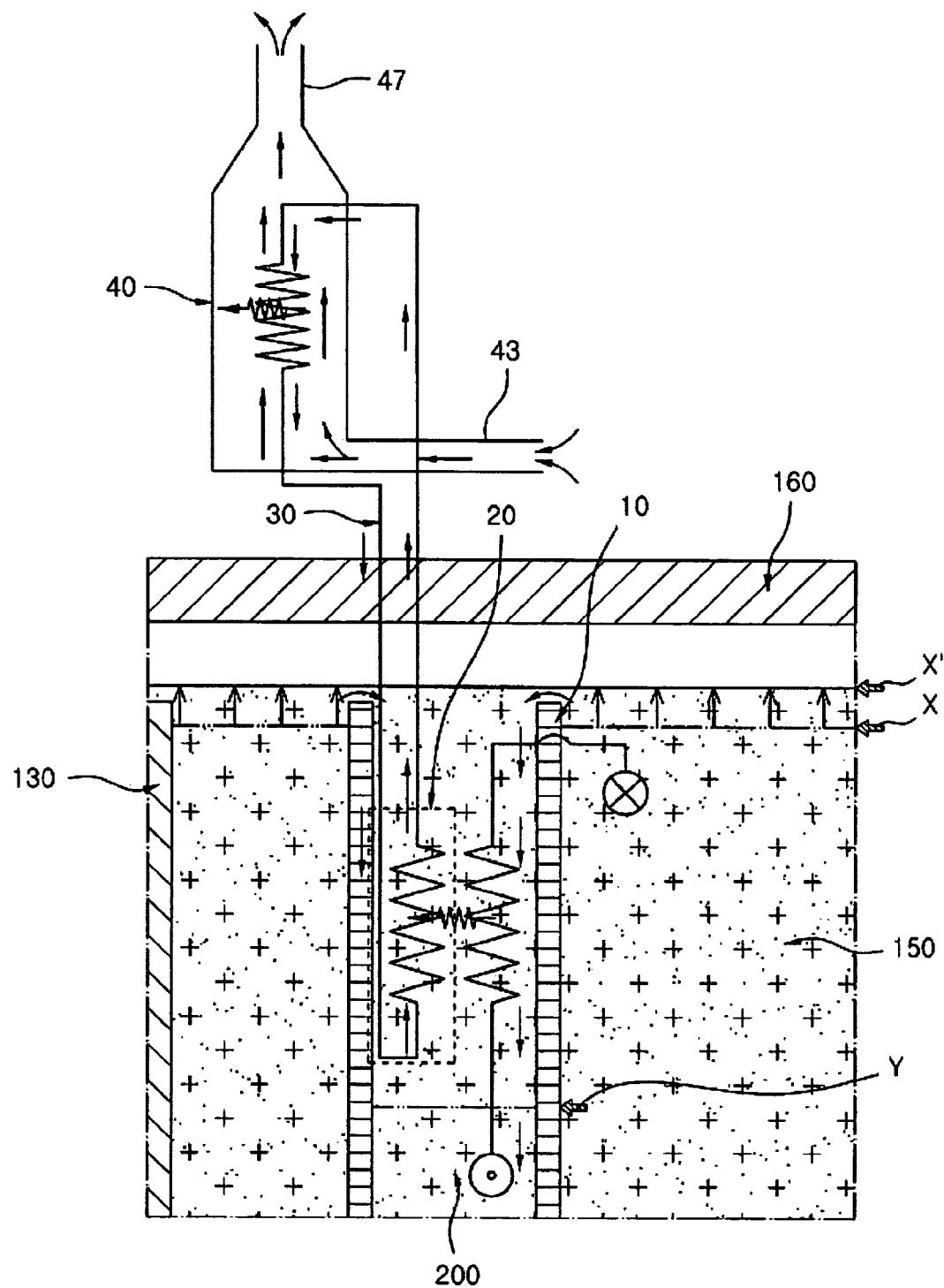
FIG. 4 is a functional view showing the operation of a decay heat removal system according to a preferred embodiment of the present invention under transient conditions.

Under transient conditions, for example, when the normal heat removal system through the intermediate heat exchanger (IHX) 140 breaks down, the primary pump 145 is automatically tripped, and accordingly the liquid level Y of the cold pool 200 rises with the result that the liquid level difference Z between the hot pool 150 and the cold pool 200 is eliminated, as shown in FIG. 4. Also, the sodium in the hot pool 150 is expanded due to the decay heat of the core 110 so that the liquid level X of the sodium in the hot pool 150 rises up to the liquid level X' above the top elevation of the reactor baffle 130 and the circular vertical tube 10. Consequently, the hot sodium flows over the overflow slot on the reactor baffle 130 and the circular vertical tube 10, and flows into the annular space between the reactor vessel 100 and the reactor baffle 130 and into the circular vertical tube 10, in which the sodium-sodium heat exchanger 20 is mounted. At this time, the sodium-sodium heat exchanger 20 mounted in the circular vertical tube 10 makes direct contact with the hot sodium so that heat is transmitted from the hot sodium to the heat removing sodium loop 30 via the sodium-sodium heat exchanger 20. As a result of heat removal at the sodium-sodium heat exchanger, the density of the sodium inside the circular vertical tube 10 increases so that the density of the sodium inside the circular vertical tube 10 is higher than that of the sodium outside the circular vertical tube 10. Such density difference induces natural circulation of the sodium from the hot pool 150 to the cold pool 200. As the hot sodium flows through the annular space between the circular vertical tube 10 and the heat transmitting tubes 27 of the sodium-sodium heat exchanger 20, the heat exchange mechanism between the hot pool 150 and the sodium-sodium heat exchanger 20, which performs heat transfer only by thermal radiation during the normal steady-state conditions, converted into the heat exchange mechanism performing heat transfer by convection due to the flow of the hot sodium in the circular vertical tube 10. Consequently, rapid heat transfer is accomplished from the hot pool 150 and the sodium-sodium heat exchanger 20 so that the heat of the hot pool 150 is effectively removed.

The operation of the sodium-sodium heat exchanger 20 under normal steady-state conditions and under transient conditions will be described in more detail.

Under the normal steady-state conditions as shown in FIG. 5, sodium in the heat removing sodium loop 30, which has been cooled in the sodium-air heat exchanger 40, is introduced into the upper center part of the sodium-sodium heat exchanger 20, and moves downward along the cold sodium downcomer 23. After turning 180 degrees at the lower end of the cold sodium downcomer 23, the sodium moves upward along the heat transmitting tubes 27 surrounding the outer circumference of the cold sodium downcomer 23. At this time, the sodium moving upward along the heat transmitting tubes 27 absorbs heat necessary for preventing solidification of the sodium in the heat removing sodium loop 30 by means of a radiation heat transfer mechanism performing heat transfer by thermal radiation between the inner circumference of the circular vertical tube 10 and the heat transmitting tubes 27 of the sodium-sodium heat exchanger 20. The sodium absorbing the heat continuously moves upward by the density difference so that the sodium is collected in the heated sodium collector 29 above the heat transmitting tubes 27. The collected sodium is introduced into the sodium-air heat exchanger 40 via the hot leg 37 of the heat removing sodium loop 30. The sodium introduced into the sodium-air heat exchanger 40 is cooled by heat transfer between the sodium and the external air introduced into the sodium-air heat exchanger 40 via the air inlet 43. Thereafter, the cold sodium is supplied again into the sodium-sodium heat exchanger 20 via the cold leg 33 of the heat removing sodium loop 30.

Under the transient conditions as shown in FIG. 6, sodium in the heat removing sodium loop 30, which has been cooled in the sodium-air heat exchanger 40, is introduced into the upper center part of the sodium-sodium heat exchanger 20, and moves downward along the cold sodium downcomer 23. After turning 180 degrees at the lower end of the cold sodium downcomer 23, the sodium moves upward along the heat transmitting tubes 27 surrounding the outer circumference of the cold sodium downcomer 23. At this time, the sodium moving upward along the heat transmitting tubes 27 rapidly absorbs heat by means of direct contact between the hot sodium introduced into the circular vertical tube 10 and the outer circumference of the sodium-sodium heat exchanger 20 and the convection heat transfer mechanism based on the natural circulation of the sodium from the hot pool 150 to the cold pool 200. The sodium absorbing the heat continuously moves upward so that the sodium is collected in the heated sodium collector 29 above the heat transmitting tubes 27. The collected sodium is introduced into the sodium-air heat exchanger 40 via the hot leg 37 of the heat removing sodium loop 30. The sodium introduced into the sodium-air heat exchanger 40 is cooled by a convection heat transfer between the sodium and the external air introduced into the sodium-air heat exchanger 40 via the air inlet 43.

The aforesaid circulation of the heat removing sodium is continuously accomplished by means of the natural circulation caused by the density difference. Consequently, the core decay heat can be continuously discharged into the final heat sink, i.e., the atmosphere, without operator action or any active component actuation.

The decay heat removal system of the present invention is capable of simultaneously performing the decay heat removal accomplished by the conventional passive vessel cooling system (PVCS), whereby the decay heat removal system of the present invention can be easily applied to a large thermal rated liquid metal reactor.

Figure 7:
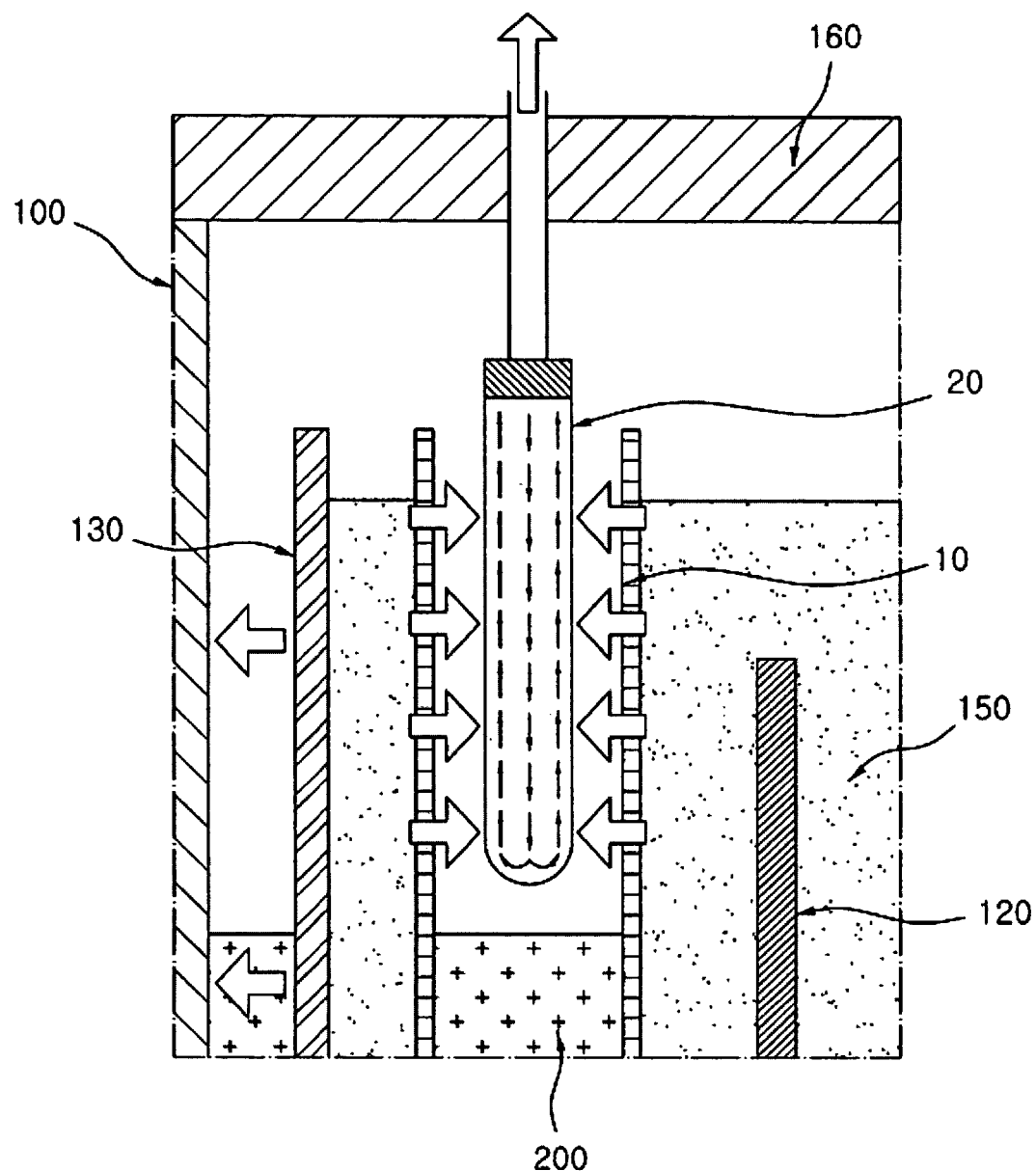
FIG. 7 is a partial conceptual view showing the heat transfer mechanism of a liquid metal reactor equipped with a decay heat removal system according to a preferred embodiment of the present invention under normal steady-state conditions.

In the liquid metal reactor equipped with the decay heat removal system of the present invention, the liquid level Y is low in the circular vertical tube 10, in which the sodium-sodium heat exchanger 20 is mounted, and in the annular space between the reactor baffle 130 and the reactor vessel 100, by the liquid level difference Z between the hot pool 150 and the cold pool 200 generated from pumping head of the primary pump 145 under the normal steady-state conditions as shown in FIG. 7. Consequently, the sodium-sodium heat exchanger 20 is enclosed by cover gas, which is filled in the upper part of the hot pool 150 and in the upper part of the cold pool 200, while it does not come into direct contact with the sodium. The cover gas filled in the annular space between the reactor vessel 100 and the reactor baffle 130 serves as a thermal cover as in the passive vessel cooling system (PVCS) so that only the minimum heat loss by a radiation heat transfer from the outer circumference of the reactor vessel 100 is incurred during the normal plant operation. The heat removal through the sodium-sodium heat exchanger 20 is accomplished only by a radiation heat transfer between the inner circumference of the circular vertical tube 10 and the heat transmitting tubes 27 of the sodium-sodium heat exchanger 20. In other words, the heat is transmitted to the heat removing sodium loop 30 only by a radiation heat transfer between the inner circumference of the circular vertical tube 10 and the heat transmitting tubes 27 of the sodium-sodium heat exchanger 20. Consequently, the amount of the heat transmitted to the heat removing sodium loop 30 is decreased as compared to the amount of the heat removed due to the heat transfer by direct contact with the sodium, and thus heat loss is minimized under the normal steady-state conditions.

Figure 8:
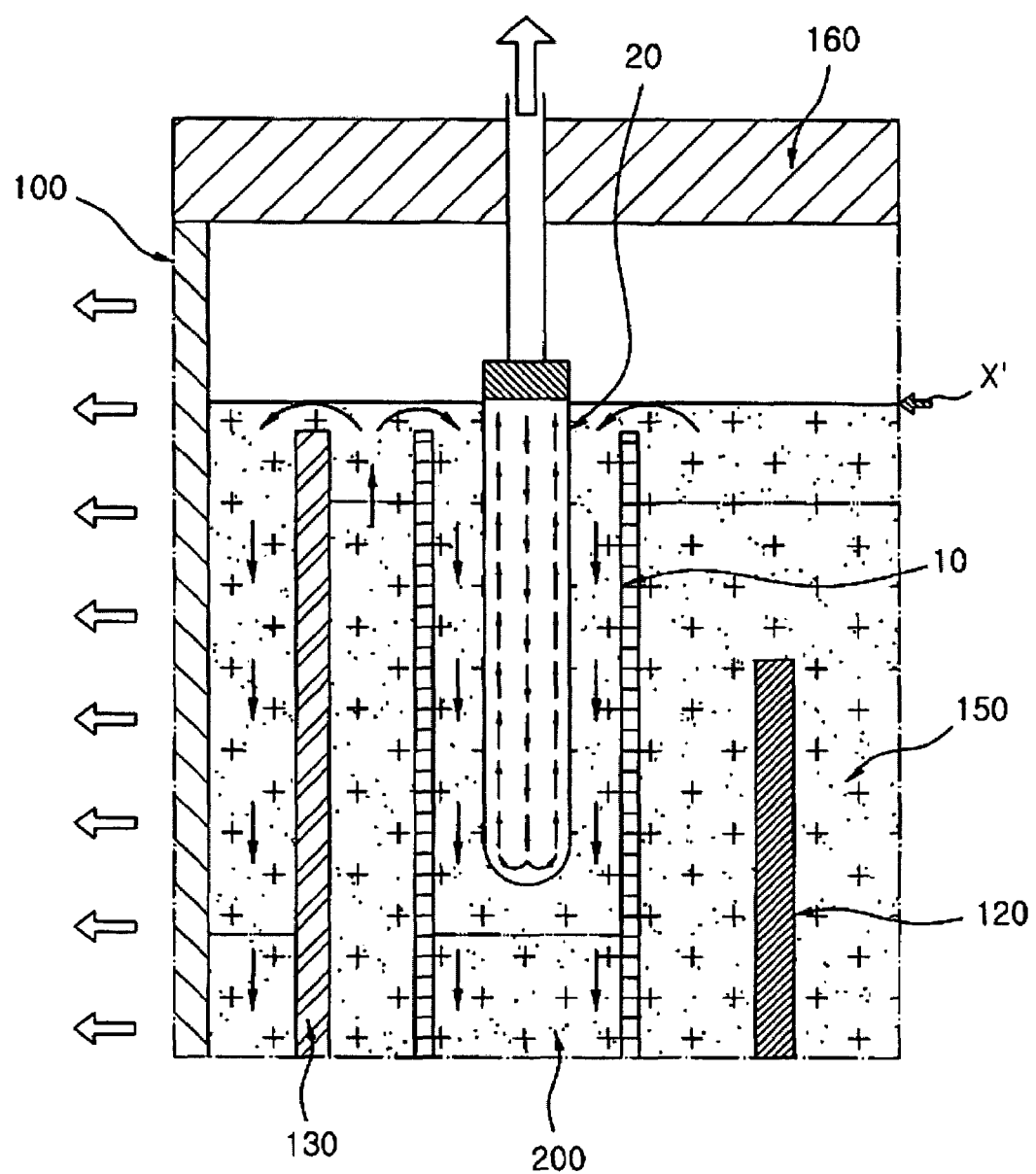
FIG. 8 is a partial conceptual view showing the heat transfer mechanism of a liquid metal reactor equipped with a decay heat removal system according to a preferred embodiment of the present invention under transient conditions.
Figure 9:
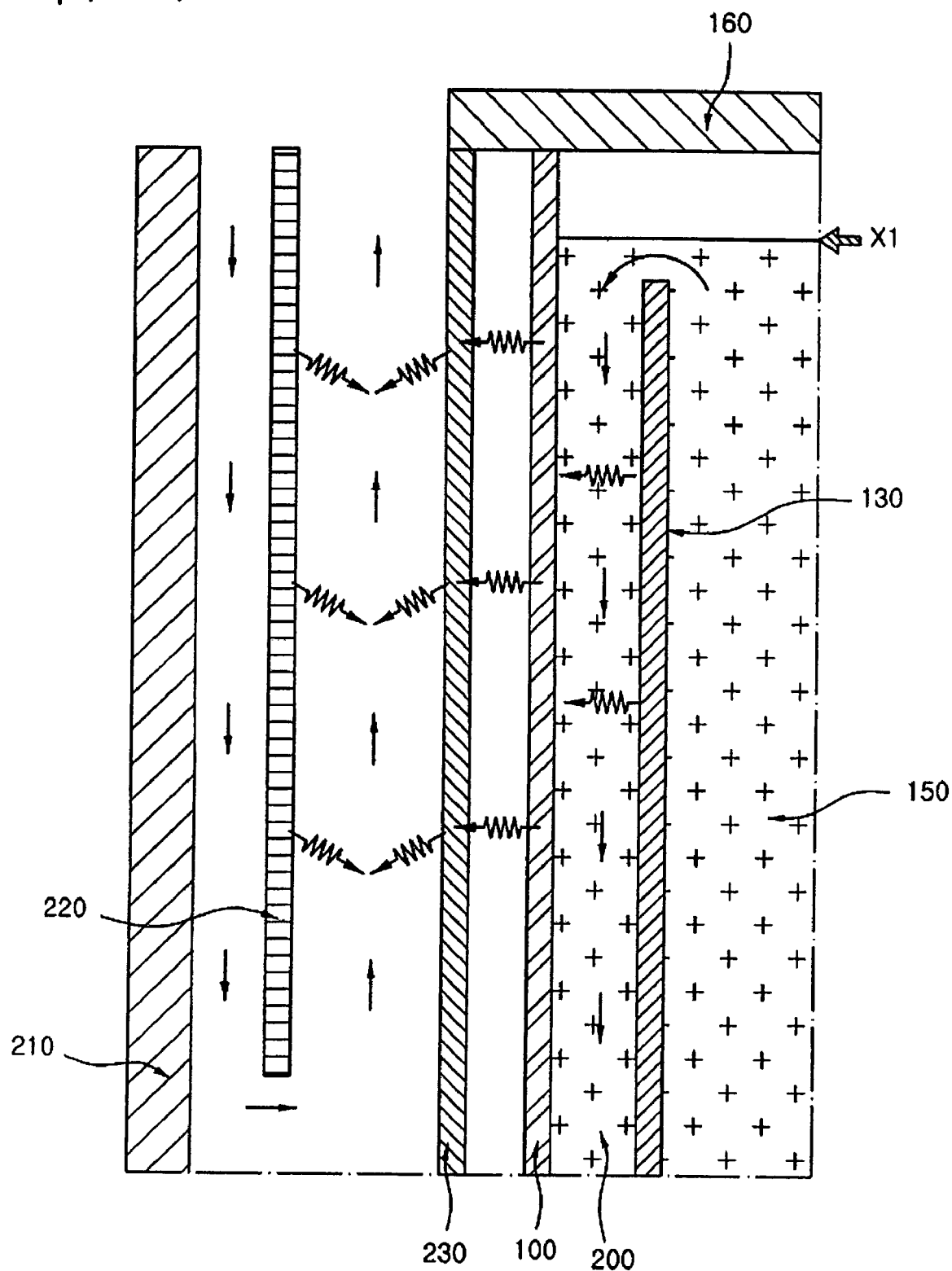
FIG. 9 is a partial conceptual view showing the heat transfer mechanism of a liquid metal reactor equipped with a conventional passive vessel cooling type decay heat removal system.

In the liquid metal reactor equipped with the decay heat removal system of the present invention, the primary pump 145 is not operated, and accordingly the liquid level Y of the sodium in the cold pool 200 rises with the result that the liquid level difference Z between the hot pool 150 and the cold pool 200 is eliminated, under transient conditions, for example, when the normal heat removal system breaks down, as shown in FIG. 8. The sodium in the hot pool 150 is expanded due to continuous generation of the core decay heat. Consequently, the hot sodium flows over the overflow slot on the reactor baffle 130 and the circular vertical tube 10, in which the sodium-sodium heat exchanger 20 is mounted, so that heat removal by direct contact of the inner circumference of the reactor vessel 100 and the hot sodium as in the passive vessel cooling system (PVCS) is performed, and simultaneously heat removal by direct contact of the sodium-sodium heat exchanger 20 in the circular vertical tube 10 and the hot sodium as in the direct reactor cooling system (DRCS) is also performed. In this way, the core decay heat is effectively discharged into the final heat sink, i.e., the atmosphere under the transient conditions.

The direct pool cooling type decay heat removal system of the present invention is operated on the basis of the completely passive concept as in the passive vessel cooling system while it provides a large heat removal capacity, whereby the decay heat removal system of the present invention can be easily applied to a large thermal rated liquid metal reactor.

As apparent from the above description, the present invention provides a direct pool cooling type passive safety grade decay heat removal method and system for a liquid metal reactor which are capable of effectively removing decay heat on the basis of a completely passive concept without the provision of dampers disposed in an inlet and an outlet of a sodium-air heat exchanger and isolation valves mounted in a heat removing sodium loop as in the conventional direct reactor cooling system and therefore without operational problems caused due to malfunction of active components for actuating the dampers and the isolation valves. In addition, the minimum amount of heat necessary to prevent solidification of the sodium is supplied to the heat removing sodium loop during the normal plant operation, whereby heat loss incurred by the decay heat removal system is minimized, and thus economical efficiency of the decay heat removal system according to the present invention is increased. With the heat removal system of the present invention, it is possible to design a large thermal rated liquid metal reactor capable of removing core decay heat while having high operational reliability without operator action or any active component actuation under transient conditions, as in the passive vessel cooling system (PVCS), which is applied to small and medium-sized liquid metal reactors.

Furthermore, the decay heat removal system of the present invention is capable of performing decay heat removal accomplished by a direct reactor cooling system as well as decay heat removal accomplished by the passive vessel cooling system (PVCS), which are operated on the basis of a completely passive concept, whereby a large heat removal capacity suitable to design a large thermal rated liquid metal reactor is provided. The decay heat removal system of the present invention is also provided with a plurality of decay heat removal channels, whereby maximum safety is guaranteed with the improved operational reliability.

In conclusion, the decay heat removal system of the present invention is operated on the basis of a completely passive concept with improved operational reliability. Heat loss incurred by the decay heat removal system is minimized under normal steady-state conditions, whereby economical efficiency is maximized. The decay heat removal system of the present invention can effectively remove core decay heat under transient conditions. Moreover, the decay heat removal system of the present invention provides an additional heat removal capacity obtained by the passive vessel cooling system, whereby the decay heat removal system of the present invention can be easily applied to a large thermal rated liquid metal reactor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A process for removing decay heat from a liquid metal reactor, comprising:
   providing a liquid metal reactor comprising at least one circular vertical tube, a sodium-air heat exchanger and a sodium-sodium heat exchanger having a heated sodium collector, said sodium-sodium heat exchanger disposed within said circular vertical tube;
   transferring a quantity of sodium from said sodium-air heat exchanger into said sodium-sodium heat exchanger disposed within said at least one circular vertical tube of said liquid metal reactor;
   altering a density of said quantity of sodium via a heat transfer occurring between a quantity of hot sodium located outside said sodium-sodium heat exchanger and said quantity of sodium within said sodium-sodium heat exchanger;
   circulating a quantity of density altered sodium through said sodium-sodium heat exchanger to return to said sodium-air heat exchanger; and
   removing a quantity of decay heat from said liquid metal reactor.

2. The process of claim 1, wherein altering comprises the steps of:
   absorbing by said quantity of sodium a quantity of heat generated by said quantity of hot sodium;
   monitoring a surface emissivity of a heat transfer tube of said sodium-sodium heat exchanger and said circular vertical tube; and
   maintaining a fluidity of said quantity of density altered sodium via said heat transfer.

3. The process of claim 2, wherein absorbing comprises absorbing said quantity of heat through said circular vertical tube and said heat transfer tube from said quantity of hot sodium located in a hot pool outside said circular vertical tube.

4. The process of claim 2, wherein absorbing comprises absorbing said quantity of heat through said heat transfer tube from said quantity of hot sodium located in a cold pool of said circular vertical tube and in contact with said sodium-sodium heat exchanger.

5. The process of claim 1, wherein transferring comprises introducing a quantity of sodium from said sodium-air heat exchanger into said sodium-sodium heat exchanger through a cold leg of a heat removing sodium loop of said sodium-sodium heat exchanger.

6. The process of claim 1, wherein circulating comprises the steps of:
flowing downwardly said quantity of sodium through a cold sodium downcomer of said sodium-sodium heat exchanger;
flowing upwardly said quantity of density altered sodium through a heat transmitting tube of said sodium-sodium heat exchanger;
collecting said quantity of density altered sodium in said heated sodium collector of said sodium-sodium heat exchanger;
transferring said quantity of density altered sodium from said heat sodium collector into said sodium-air heat exchanger through a hot leg of a heat-removing sodium loop of said sodium-sodium heat exchanger;
cooling said quantity of density altered sodium in said sodium-air heat exchanger; and
reintroducing a quantity of sodium into a cold leg of said heat-removing sodium loop.

* * * * *